United States Patent
Suzuki et al.

(10) Patent No.: US 8,380,776 B2
(45) Date of Patent: Feb. 19, 2013

(54) COMPUTATIONAL METHOD OF MATERIAL CONSTANT OF COMPOSITE MATERIAL AND VOLUME FRACTION OF MATERIAL COMPONENT IN COMPOSITE MATERIAL, AND RECORDING MEDIUM

(75) Inventors: Nobuo Suzuki, Kanagawa (JP); Kazuyuki Kabe, Kanagawa (JP); Seiichi Nomura, Arlington, TX (US)

(73) Assignee: The Yokohama Rubber Co., Ltd., Tokyo (JP)

( * ) Notice: Subject to any disclaimer, the term of this patent is extended or adjusted under 35 U.S.C. 154(b) by 1024 days.

(21) Appl. No.: 12/396,199

(22) Filed: Mar. 2, 2009

(65) Prior Publication Data
US 2010/0223313 A1 Sep. 2, 2010

(51) Int. Cl.
*G06F 7/38* (2006.01)
*G06F 7/60* (2006.01)
*G01N 31/00* (2006.01)
*G01L 1/00* (2006.01)
*G06G 7/56* (2006.01)
*G06G 7/58* (2006.01)

(52) U.S. Cl. ............ 708/446; 708/490; 702/22; 702/27; 702/42; 703/2; 703/5; 703/12

(58) Field of Classification Search .................. 708/446, 708/490; 702/22, 34, 42; 703/2, 5, 7, 14; 264/40.1; 428/615
See application file for complete search history.

(56) References Cited

U.S. PATENT DOCUMENTS

| | | | | |
|---|---|---|---|---|
| 5,170,367 A * | 12/1992 | Mackay et al. | ............... | 702/22 |
| 5,437,190 A * | 8/1995 | Ehrenpreis et al. | ............ | 73/802 |
| 7,557,367 B2 * | 7/2009 | Rogers et al. | ..................... | 257/9 |
| 2003/0060987 A1* | 3/2003 | Dao et al. | ........................ | 702/42 |
| 2003/0216894 A1* | 11/2003 | Ghaboussi et al. | ............... | 703/2 |
| 2006/0095493 A1* | 5/2006 | Kumano et al. | ............... | 708/490 |
| 2007/0075450 A1* | 4/2007 | Belegundu et al. | ......... | 264/40.1 |
| 2007/0100565 A1* | 5/2007 | Gosse et al. | ..................... | 702/34 |
| 2009/0294803 A1* | 12/2009 | Nuzzo et al. | .................. | 257/213 |
| 2010/0025263 A1* | 2/2010 | White et al. | ............... | 205/777.5 |
| 2010/0317132 A1* | 12/2010 | Rogers et al. | ................... | 438/27 |

FOREIGN PATENT DOCUMENTS

| | | |
|---|---|---|
| JP | 2003-347301 A | 12/2003 |
| JP | 2007-122242 A | 5/2007 |
| JP | 2007-265382 A | 10/2007 |

* cited by examiner

*Primary Examiner* — Idriss N Alrobaye
*Assistant Examiner* — Henry Yu
(74) *Attorney, Agent, or Firm* — Global IP Counselors, LLP (57) ABSTRACT

The overall material constant of a composite material is computed where the composite material includes multiple kinds of material components in a matrix phase, each of the material constants of the material components and the matrix phase being known. First, for the composite material, an equation, having the material constant of a virtual composite material as an unknown, is prepared by defining the virtual composite material in which each of the material components is dispersed in a form of spherical particles in the matrix phase at a known volume fractions. Next, the overall material constant of the virtual composite material is found as the overall material constant of the composite material by solving the equation. In this case, the equation is a recursive equation which is obtained using the self-consistent method. The volume fraction of a material component in the composite material is computed using the equation.

12 Claims, 6 Drawing Sheets

COMPUTATIONAL METHOD OF MATERIAL CONSTANT OF COMPOSITE MATERIAL AND VOLUME FRACTION OF MATERIAL COMPONENT IN COMPOSITE MATERIAL, AND RECORDING MEDIUM

BACKGROUND OF THE INVENTION

1. Field of the Invention

The present invention relates to a method of computing the overall mechanical material constant, as the mechanical characteristic, of a composite material which includes material components in a matrix phase, each of the mechanical material constants of the material components and the matrix phase being known. Additionally, the present invention relates to a method of computing the volume fraction of a material component in a composite material which includes material components in a matrix phase, each of the mechanical material constants of the material components and the matrix phase being known. Furthermore, the present invention relates to a recording medium storing a program for a computer to execute the aforementioned methods.

2. Description of the Related Arts

Conventionally, a variety of attempts have been actively employed for accurately estimating the mechanical characteristic of a composite material in which predetermined material components are dispersed in a matrix phase. The estimation intends to efficiently identify a variety of factors using a computer for tailoring the composite material to have a desired characteristic, instead of finding them by conducting an actual experiment. For example, the factors may include identification of the mechanical characteristics of the material components in the composite material and the volume fractions of the material components. As a result, it is possible to design a mixture of components with desired characteristics in an early stage.

Under the circumstance, JP-A-2007-122242 discloses a method for analyzing a macro-structure which consists of multiple minute elements in which a micro-structure that has a three-dimensionally heterogeneous deformation characteristic is repeated periodically in one direction. In the publication, the homogenized elastic modulus is computed by identifying a unit cell (i.e., a periodic unit in the macro-structure) and assuming the unit cell to have a homogeneous material characteristic. Subsequently, the macro-structure is modeled by assuming that it has a homogenized elastic characteristic. Then, a macro-scale analysis is executed for computing the deformation of the macro-structure at a given position in the direction of the periodical arrangement. Furthermore, a local analysis is executed. In the local analysis, the obtained deformation of the macro-structure at a given position in the direction of the periodical arrangement is applied to the minute elements forming the unit cell arranged in the position, and local responses are obtained from the minute elements.

According to the publication, the structural analysis method is capable of reducing a period of time necessary for the structural computation of the macro-structure which is heterogeneous on its cross-section.

However, the structural analysis method is executed using a finite element model formed with minute elements. Accordingly, the method has a drawback in that a long period of time is required for generation and computation of a model and it cannot be thereby a useful means for time-critical initial design and early development.

On the other hand, a classical analytical model, using a spring and a dash pot, has also been conventionally used for computing the mechanical characteristic of composite materials. The computational time for this model is short and the model is efficient in this regard. However, the micro-state of a composite material cannot be taken into account in the model. Therefore, the model also has a drawback in that a computational result does not include much information and thereby the computational result is not accurate.

SUMMARY OF THE INVENTION

In order to overcome the drawbacks, it is an object of the present invention to provide a method of computing the material constant of a composite material and a method of computing the volume fraction of a material component in the composite material for more efficient computation in a shorter period of time than the conventional computational method using a finite element model. Furthermore, it is an object of the present invention to provide a recording medium storing a program for a computer to execute the methods.

The objects are achieved by a method of computing the overall mechanical material constant of a composite material which includes multiple kinds of material components in a matrix phase where the mechanical material constants of each of the material components and the matrix phase are known. The method includes the steps of:

(A) preparing a nonlinear equation having an overall material constant of a virtual composite material as an unknown by defining, as the composite material, a virtual composite material in which the material components at a known volume fraction are dispersed in a form of spherical particles in a matrix phase whose material constant is the overall material constant of the composite material; and (B) finding the overall material constant of the virtual composite material as the overall material constant of the composite material by solving the prepared nonlinear equation.

(C) In this case, the nonlinear equation is a recursive nonlinear equation which is obtained by defining, as the overall material constant of the virtual composite material to be computed, a material constant in the surrounding region of the spherical particles corresponding to the multiple kinds of material components in the virtual composite material.

Furthermore, the aforementioned objects are achieved by a method of computing the volume fraction of any one of multiple kinds of material components in the composite material which includes the multiple kinds of material components in the matrix phase, each of the material constants of the material components and the matrix phase being known. The method includes the steps of:

(D) determining the overall material constant of the composite material from an experimental result;

(E) preparing a nonlinear equation having the volume fraction of any one of multiple kinds of material components in the virtual composite material as an unknown by defining, as the composite material, the virtual composite material in which each of the multiple kinds of material components are dispersed in a form of spherical particles in the matrix phase; and (F) finding the volume fraction of any one of the multiple kinds of material components by solving the prepared nonlinear equation.

(G) In this case, the nonlinear equation is a recursive nonlinear equation which is obtained by defining, as the determined overall material constant of the composite material, a material constant of the phase surrounding each of the spherical particles of the multiple kinds of material components in the virtual composite material.

Furthermore, the aforementioned objects are achieved by a recording medium storing a computer-executable program for computing the overall material constant of the composite material, using the above computational method. The composite material includes multiple kinds of material components in a matrix phase, each of the material constants of the material components and the matrix phase being known. Similarly, the aforementioned objects are achieved by a recording medium storing a computer-executable program for computing the volume fraction of any one of the multiple kinds of material components in the composite material, using the computational method.

The recursive nonlinear equation, common to the above-mentioned computational methods, is based on Equation (6) to be described. Specifically, the proportional constants, $A^U$, $A^F$, in Equation (6) used for the recursive nonlinear equation are found by solving the strain field of the virtual composite material using the Navier equation. In this case, the material constant in the surrounding area of the spherical particles in the virtual composite material is defined as the overall material constant of the virtual composite material. In other words, the self-consistent approximation method is herein used.

According to the present invention, the virtual composite material is defined as the one where multiple kinds of material components are dispersed in a form of spherical particles in the matrix phase. Furthermore, the nonlinear equation to be herein used is an analytical recursive nonlinear equation which is obtained by defining the material constant in the surrounding area of the spherical particles in the virtual composite material as the overall material constant of the virtual composite material to be computed. Therefore, it is possible to efficiently compute the overall material constant of the composite material and the volume fraction of a predetermined material component in the composite material in a short period of time.

DETAILED DESCRIPTION OF THE EMBODIMENTS

Figure 1:
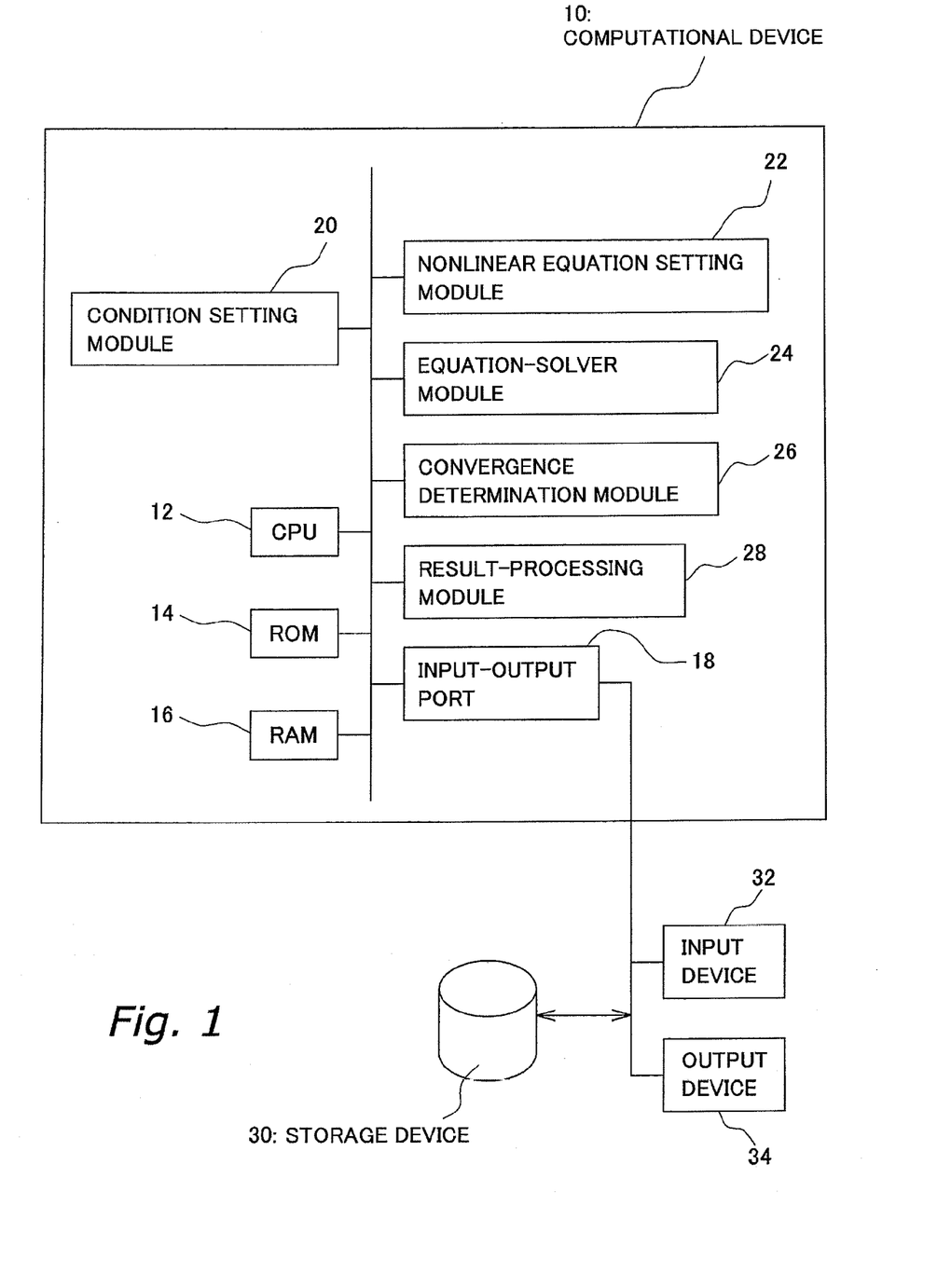
FIG. 1 is a schematic diagram for illustrating an example of a computational device for executing both of the methods of computing the material constant of a composite material according to the present invention and computing the volume fraction of a material component in the composite material according to the present invention.

Following is a detailed explanation of the method of computing the material constant of a composite material according to the present invention and the method of computing the volume fraction of a material component in the composite material according to the present invention. The explanation is based on an embodiment illustrated in the drawings. FIG. 1 illustrates a configuration of a computational device 10 for executing the method of computing the material constant of a composite material and the method of computing the volume fraction of a material component in the composite material according to the present invention.

The computational device 10 configures a computer including a CPU 12, ROM 14, RAM 16 and an input-output port 18. The computational device 10 forms a condition setting module 20, a nonlinear equation setting module 22, an equation solver module 24, a convergence determination module 26 and a result processing module 28 invoked when a program stored in the storage device 30 starts up. In other words, the modules are invoked when the software is started. For example, some modules of the computational device 10 use a computer algebra system.

Additionally, the computational device 10 is connected to a storage device 30, an input device 32 (e.g., a mouse and a keyboard), an output device 34 (e.g., a printer and a monitor) and the like through the input-output port 18.

The computational device 10 selectively executes either one of:
(1) the first processing of computing the overall mechanical material constant of a composite material which includes multiple kinds of material components having known mechanical material constants in a matrix phase having a known mechanical material constant; and
(2) the second processing for computing the volume fraction(s) of at least one kind of material component in the composite material which includes multiple kinds of material components having known mechanical material constants in a matrix phase having a known mechanical material constant.

The condition setting module 20 determines which of the first processing and the second processing will be executed. Simultaneously, the module 20 prepares information required for the first processing or the second processing and sets a variety of values based on the information.

In the first processing, the module 20 sets a value of the material constant of the matrix phase, a value(s) of the material constant(s) of a single or multiple kind(s) of material components and a value(s) of the volume fraction(s) of the single or multiple kind(s) of material components. For example, the material constant herein includes a pair of the Lamé constants $\lambda$, $\mu$, or a pair of the bulk modulus K and either one of the Lamé constants $\lambda$, $\mu$. A pair of the Lamé constants $\lambda$, $\mu$ will be hereinafter mainly used. However, it is also acceptable to use a pair of the bulk modulus K and either one of the Lamé constants $\lambda$, $\mu$.

In the second processing, on the other hand, the module 20 sets a value of the overall material constant of the composite material obtained by an experiment, the values of the material constants of the multiple kinds of material components and the value(s) of the volume fraction(s) of at least one of the multiple kinds of material components.

The values are set by an instruction inputted by an operator through the input device 32. Alternatively, the values are set by calling up preliminarily stored information from the storage device 30.

The nonlinear equation setting module 22 prepares a nonlinear equation with the value of the material constant and the value of the volume fraction which have been set by the module 20, depending on the first processing or the second processing. In both of the first processing and the second processing, when the composite material is assumed to include multiple kinds of material components of spherical shape dispersed in a matrix phase, the module 22 calls up a recursive nonlinear equation for computing the overall material constant of the composite material (i.e., Equation (6) to be described), and gives appropriate values to the coefficients of the equation based on the material constants and the volume fraction. Consequently, an equation, composed of unknowns to be computed, is herein prepared.

In the first processing, the equation solver module 24 computes the overall material constant of the composite material based on its initial approximation value using the prepared recursive nonlinear equation employing the Newton-Raphson method. In other words, the module 24 firstly sets initial value (where n=1) of the overall material constant of the composite material. Then, the module 24 iteratively computes an approximate value for the overall material constant of the composite material (where n=2), that is, a more closely convergent value, based on the recurrence formula using the initial value. The more closely convergent value is transmitted to the convergence determination module 26 to be described later. When the module 26 determines that the value is not convergent, the module 24 repeats the computation of the overall material constant of the composite material (where n=3), that is, a further closely convergent value, based on the aforementioned recurrence formula using the previously computed value of the overall material constant. Thus, the module 24 repeatedly executes processing for recursively computing the overall material constant of the composite material until the module 26 determines that the value is convergent.

In the second processing, on the other hand, the equation solver module 24 defines the following function f(x) (note "x" is the volume fraction of a predetermined material component to be computed). Then, the module 24 computes a product $f(x_1) \cdot f(x_2)$ by multiplying $f(x_1)$ (where $x=x_1$ (maximum)) and $f(x_2)$ (where $x=x_2$ (minimum)). The module 24 transmits the product to the convergence determination module 26.

The function f(x)=(the overall material constant of the composite material obtained by an experiment)−(the overall material constant of the composite material having the volume fraction x to be computed from the recursive nonlinear equation (6)).

The product $f(x_1) \cdot f(x_2)$ is repeatedly computed until convergence is reached while the maximum value ($x=x_1$) and the minimum value ($x=x_2$) are changed.

The convergence determination module 26 determines if the overall material constant of the composite material computed by the equation solver module 24 is convergent.

In the first processing, when the absolute value of the difference between the value of the overall material constant of the composite material computed at the number of repetition (n+1) and the value of the overall material constant of the composite material computed at the number of repetition (n) is less than a preliminarily-set threshold, the convergence determination module 26 determines that the value of the overall material constant of the composite material at the number of repetition (n+1) is convergent. Otherwise, the module 26 determines that the overall material constant of the composite material at the number of repetition (n+1) is not convergent. Accordingly, the equation solver module 24 is instructed to execute computation with the obtained value at the number of repetition (n+1). As described above, the recursive nonlinear equation is an equation with explicit numeric values given to the coefficients. Accordingly, the derivative of such a function is also easily computed. Therefore, the module 26 is capable of computing the convergence value using the Newton-Raphson method.

In the second processing, on the other hand, the sign of $f(x_1) \cdot f(x_2)$ is checked. Then, as described below, the maximum value and the minimum value of x are set using the bisection method.

The result processing module 28 computes the Young modulus or the shear stiffness of the composite material or obtains the volume fraction of a predetermined material component to be computed with the value determined as convergence by the module 26.

The output device 34 prints out a variety of information obtained by the module 28. Alternatively, the output device 34 displays the variety of information on a screen.

The storage device 30 preliminarily stores a database having recorded and held preliminarily-set material constants of the composite material and preliminarily-set material constant(s) of a single or multiple kind(s) of material components in the composite material.

When a composite material is assumed to include two different kinds of material components β and γ in a matrix phase α, the equation solver module 24 firstly defines a homogeneous first virtual composite material in which the material component β and γ are dispersed in the matrix phase α, and then computes the overall material constant of the virtual composite material.

The aforementioned processing is achieved by analytically computing the overall material constant of the composite material using the following recursive nonlinear equation. The following is a detailed explanation of the recursive nonlinear equation.

Figure 2A:
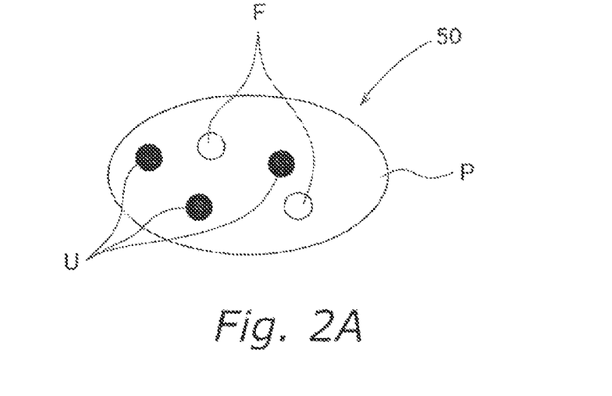
FIGS. 2A to 2C are diagrams for illustrating the stress and strain in a composite material.
Figure 2B:
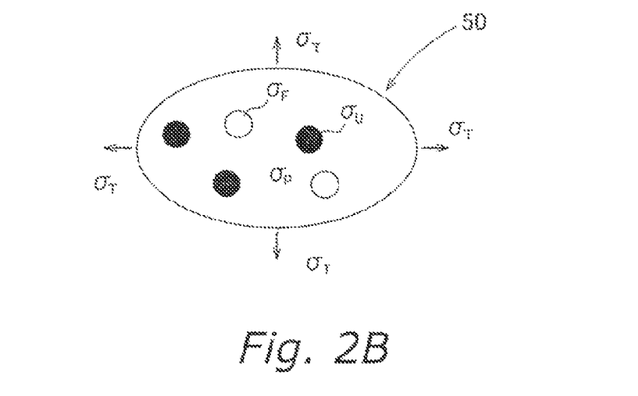
Figure 2C:
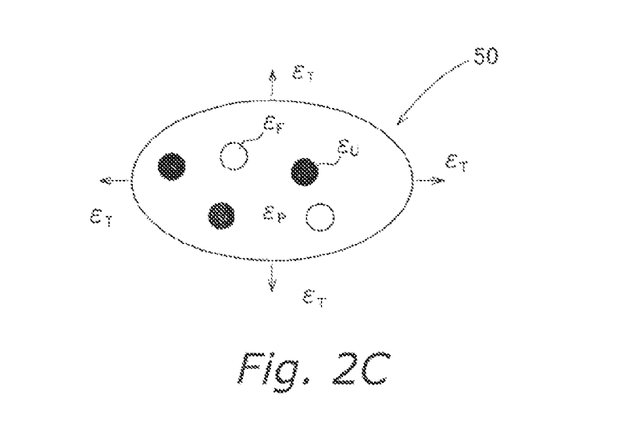

FIGS. 2A to 2C are diagrams for illustrating the composite material.

As illustrated in FIG. 2A, the composite material 50 includes urethane U and filler F in the matrix phase composed of epoxy resin (hereinafter simply referred to as "epoxy").

FIGS. 2B and 2C illustrate the stress and strain in the composite material 50. The "stress," "strain" and "material constant," hereinafter explained, are a second rank tensor, a second rank tensor and a fourth rank tensor, respectively. However, they will be denoted as a scalar form for easy understanding.

As illustrated in FIG. 2B, in the composite material 50, the average stress $\sigma_T$ of the composite material is computed by volume-averaging the stress $\sigma_U$ in Urethane U, the stress $\sigma_F$ in Filler F and the stress $\sigma_P$ in Epoxy P. As illustrated in FIG. 2C, in response to these stresses, the volume-averaged strain $\epsilon_T$ of the composite material is computed by volume-averaging the strain $\epsilon_U$ in Urethane U, the strain $\epsilon_F$ in Filler F and the strain $\epsilon_P$ in Epoxy P. The average stress $\sigma_T$ is expressed by Equation (1) whereas the average strain $\epsilon_T$ is expressed by Equation (2). The average stress $\sigma_T$ means the volume-weighted average stress which is a weighted average stress with a volume fraction as a weighting coefficient, whereas the average strain $\epsilon_T$ means the volume-weighted average strain which is a weighted average strain with a volume fraction as a weighting coefficient.

Equation 1:

$$\sigma_T = v_P \sigma_P + v_U \sigma_U + v_F \sigma_F \quad (1)$$

Equation 2:

$$\epsilon_T = v_P \epsilon_P + v_U \epsilon_U + v_F \epsilon_F \quad (2)$$

Figure 3:
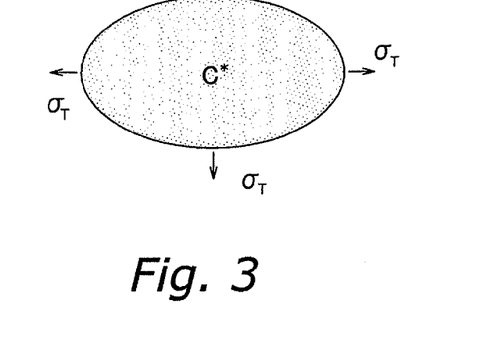
FIG. 3 is a diagram for illustrating a homogenized virtual composite material to be used for both of the methods of computing the material constant of the composite material and computing the volume fraction of a material component in the composite material according to the present invention.

As illustrated in FIG. 3, on the other hand, the material constant C* for defining the relation between the average stress $\sigma_T$ and the average strain $\epsilon_T$ in the composite material is defined by Equation (3). In other words, a homogenized virtual composite material is assumed to have the material constant C*.

Equation 3:

$$\sigma_T = C^* \epsilon_T \quad (3)$$

When the strain is herein focused, the relation between the strain $\epsilon_U$ in Urethane U and the average strain $\epsilon_T$ in the composite material 50 is represented by Equation (4). Similarly, the relation between the strain $\epsilon_F$ in Filler F and the average strain $\epsilon_T$ in the composite material 50 is represented by Equation (5).

Equation 4:

$$\epsilon_U = A^U \epsilon_T \quad (4)$$

Equation 5:

$$\epsilon_F = A^F \epsilon_T \quad (5)$$

In Equation (4), the average strain $\epsilon_U$ in Urethane U is represented as a function of $\epsilon_T$. Equation (4) states that $\epsilon_U$ is associated with $\epsilon_T$ by a proportional constant $A^U$. Similarly, in Equation (5), the average strain $\epsilon_F$ in Filler F is represented as a function of $\epsilon_T$. Equation (5) states that $\epsilon_F$ is associated with $\epsilon_T$ by a proportional constant $A^F$. As described below, the proportional constants $A^U$ and $A^F$ are computed by assuming that Urethane U and Filler F are of spherical shape, and each of the surrounding areas of the spherical particles has the material constant of a homogenized virtual composite material. In other words, it is possible to represent the proportional constant $A^U$ using the material constant of Urethane U and the overall material constant C* of the homogenized virtual composite material. On the other hand, it is possible to represent the proportional constant $A^F$ using the material constant of Filler F and the overall material constant C* of the homogenized virtual composite material. When the material constant of Urethane U is denoted as $C^U$, the proportional constant $A^U$ is represented using an expression $A^U = A(C^U, C^*)$. On the other hand, when the material constant of Filler F is denoted as $C^F$, the proportional constant $A^F$ is represented using an expression $A^F = A(C^F, C^*)$. A method of computing the formula $A^U = A(C^U, C^*)$ and $A^F = A(C^F, C^*)$ will be hereinafter explained. Both of the expressions $A(C^U, C^*)$ and $A(C^F, C^*)$ are nonlinear complex expressions of "$C^U$, $C^*$" and "$C^F$, $C^*$", respectively. In this case, for example, $C^U$, $C^F$ and $C^*$ represent the Lamé constants "$\lambda^U$, $\mu^U$," "$\lambda^F$, $\mu^F$" and "$\lambda^*$, $\mu^*$" of the material components, respectively. Equation (6) is derived by organizing Equations (1) to (5) using the proportional constants $A^U$ and $A^F$.

Equation 6:

$$C^* = C^P + \upsilon_U \cdot (C^U - C^P) A^U + \upsilon_F \cdot (C^F - C^P) A^F \quad (6)$$

Equation (6) is a formula for computing the material constant C* of the left-hand side of the equation. The proportional constant $A^U$ in the right-hand side of the equation is a nonlinear expression having $C^U$ and an unknown C*, whereas the proportional constant $A^F$ therein is a nonlinear expression having $C^F$ and an unknown C*. Accordingly, Equation (6) is a recursive nonlinear equation having the material constant C* as an unknown.

Figure 4A:
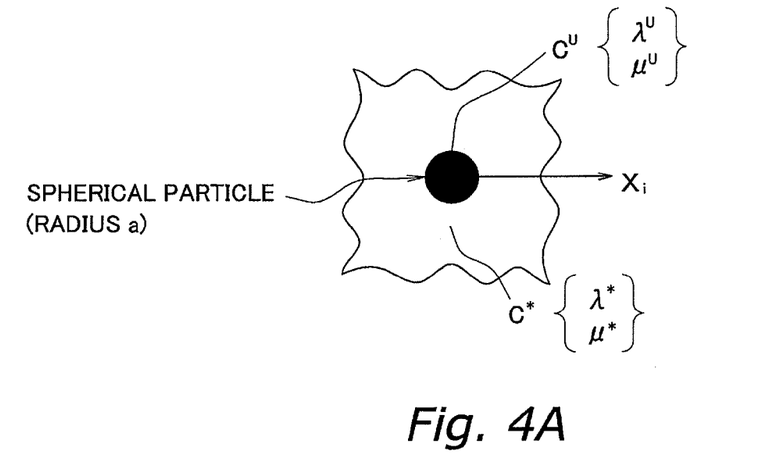
FIGS. 4A and 4B are diagrams for illustrating the structure of the virtual composite material to be used for both of the methods of computing the material constant of a composite material and computing the volume fraction of a material component in a composite material according to the present invention.
Figure 4B:
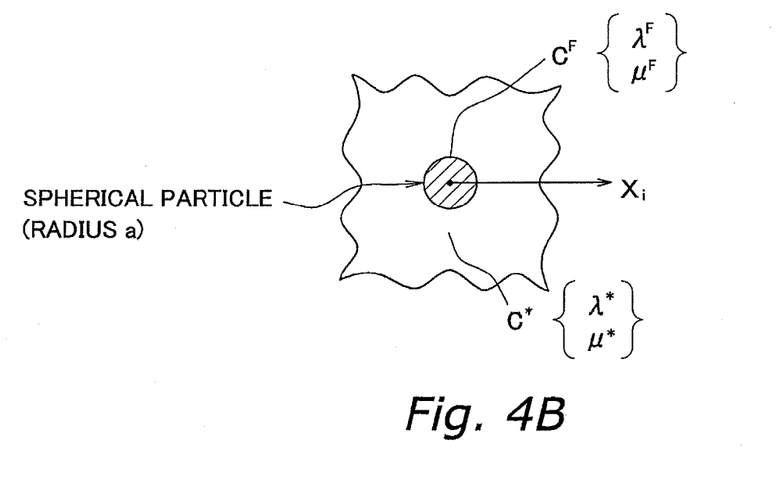

As illustrated in FIGS. 4A and 4B, the proportional constants $A^U$ and $A^F$ are obtained by assuming a model that Urethane U and Filler F are dispersed in a form of spherical particles in a homogenized virtual composite material having the material constant C* and by defining the material constant of the surrounding areas of the spherical particles as the overall material constant C* of the virtual composite material to be computed.

In other words, the proportional constants $A^U$ and $A^F$ are obtained by solving the Navier equation under the condition that body force does not exist but strain $\epsilon^\infty_{ij}$ ("i" and "j" are index numbers of 1-3) is applied at infinity. As illustrated in Equation (7), the strain $\epsilon^\infty_{ij}$, applied at infinity, is decomposed into the hydrostatic pressure term and a second term of the shear term. Accordingly, the proportional constants $A^U$ and $A^F$ are computed by decomposing them into the hydrostatic pressure term and the shear term, respectively. The only difference between the proportional constants of $A^U$ and $A^F$ is that the material constant of the spherical particles is $C^U$ for the proportional constant $A^U$, whereas the material constant of the spherical particles is $C^F$ for the proportional constant $A^F$. Therefore, the material constant $C^B$ is hereinafter used on behalf of the material constants $C^U$, $C^F$ in the following explanation.

Equation 7:

$$\epsilon^\infty_{ij} = \underbrace{\frac{1}{3}\hat{\epsilon}^\infty}_{1st \text{ term}} \delta_{ij} + \underbrace{\hat{\epsilon}^\infty_{ij}}_{2nd \text{ term}} \quad (7)$$

($\delta_{ij}$: Kronecker delta)

The following is an explanation of the method of computing the hydrostatic pressure term and the shear term in the proportional constant $A(C^B, C^*)$.

(Computation of $A(C^B, C^*)$ Based on Hydrostatic Pressure Term)

The displacement $u_i$ ("i" is an index number of 1-3), satisfying the Navier equation corresponding to the first term of the hydrostatic pressure term in Equation (7), is expressed by Equation (8). The displacement $u_i$ is uniquely expressed because of the requirement for matching the rank of the displacement tensor $u_i$ with the rank of the tensor in the right-hand side of the equation.

Here, it is possible to compute the displacement $u_i$ inside the spherical particle and displacement $u_i$ outside the spherical particle by considering a condition that the displacement $u_i$ at the origin in the spherical particle has a finite value, a condition that the strain approaches the first term in Equation (7) at infinity, and a condition of continuity of the displacement $u_i$ and the surface tension on the surface of the spherical particle. Specifically, the displacement $u_i$ inside the spherical particle is expressed by Equation (9) whereas the displacement $u_i$ outside the spherical particle is expressed by Equation (10).

Equation 8

$$u_i = \left(A + \frac{B}{r^3}\right) x_i \hat{\epsilon}^\infty \ (i = 1, 2, 3: \text{natural number}) \quad (8)$$

$\begin{pmatrix} r: \text{distance from center of spherical particle,} \\ x_i: \text{three-dimensional coordinate position} \\ A, B: \text{constant} \end{pmatrix}$ Equation 9

$$u_i = \frac{\lambda^* + 2\mu^*}{3\lambda^B + 2\mu^B + 4\mu^*} x_i \hat{\epsilon}^\infty \quad (9)$$

Equation 10

$$u_i = \left(\frac{1}{3} - \frac{1}{r^3} \cdot \frac{3\lambda^B a^3 - 3\lambda^* a^3 + 2\mu^B a^3 - 2\mu^* a^3}{3(3\lambda^B + 2\mu^B + 4\mu^*)}\right) x_i \hat{\varepsilon}^\infty \quad (10)$$

(a is radius of spherical particle)

In short, inside the spherical particle, the displacement $u_i$ is proportional to the position $x_i$ (i=1, 2 or 3) where the origin is at the center of the spherical particle. Furthermore, outside the spherical particle, the displacement $u_i$ is proportional to the position $x_i$ (i=1, 2 or 3) where the origin is at the center of the spherical particle, and its proportionality factor has a constant term and a term inversely proportional to the third power of the distance from the center of the spherical particle. Based on this, it is possible to compute the hydrostatic pressure term of the proportional constant $A(C^B, C^*)$.

Based on Equations (9) and (10), it is possible to express the stress $\sigma_{ij}$ inside the spherical particle by Equation (11), whereas it is possible to express the strain $\varepsilon_{ij}$ inside the spherical particle by Equation (12). Equation (12) corresponds to the hydrostatic pressure term of Equation (5). Accordingly, the hydrostatic pressure term of $A(C^B, C^*)$ is expressed by Equation (13). Therefore, the proportional constant $A^U$ of Urethane U is obtained by replacing $\lambda^B$, $\mu^B$ in Equation (13) by $\lambda^U$, $\mu^U$. Similarly, the proportional constant $A^F$ of Filler F is obtained by replacing $\lambda^B$, $\mu^B$ in Equation (13) by $\lambda^F$, $\mu^F$.

Equation 11

$$\sigma_{ij} = \frac{(3\lambda^B + 2\mu^B)(\lambda^* + 2\mu^*)}{(3\lambda^* + 2\mu^*)(3\lambda^B + 2\mu^B + 4\mu^*)} \hat{\sigma}^\infty \delta_{ij} \quad (11)$$

Equation 12

$$\varepsilon_{ij} = \frac{\lambda^* + 2\mu^*}{3\lambda^B + 2\mu^B + 4\mu^*} \hat{\varepsilon}^\infty \delta_{ij} \quad (12)$$

Equation 13

$$\text{Hydrostatic Pressure Element of } A(C^B, C^*) = \frac{\lambda^* 2\mu^*}{3\lambda^B + 2\mu^B + 4\mu^*} \quad (13)$$

(Computation of $A(C^B, C^*)$ Based on Shear Term)

In both outside and inside the spherical particle, the displacement $u_i$ ("i" is an index number of 1, 2 or 3), satisfying the Navier equation corresponding to the shear term in Equation (7), is expressed by terms proportional to the zeroth-power, second-power, inverse third-power and fifth-power of the distance from the center of the spherical particle. This comes from the requirement that the displacement $u_i$ is proportional to "$\{f(r) \cdot (x_i x_j / r^2) + g(r) \cdot \delta_{ij}\} x_k \varepsilon^\infty_{jk}$" (each of "i", "j" and "k" is an integer of 1-3). The equation is uniquely determined because of the requirement for matching the ranks of tensors in the Navier equation. In this case, "$x_j$" and "$x_k$" represent the coordinate components in the three-dimensional coordinate. The coordinate components "$x_j$" and "$x_k$" are different from the coordinate component "x." Furthermore, the functions f(r) and g(r) are functions of the distance "r" from the center of the spherical particle only. The order $\ell$ of "r" is herein computed using the order analysis by assuming that f(r) and g(r), satisfying the Navier equation, have the following relations, respectively: $f(r) \propto r^\ell$ and $g(r) \propto r^\ell$ ("$\ell$" is an integer). As a result, the orders $\ell$ of "r" are calculated to be 0, 2, −3 and 5. Accordingly, the displacement $u_i$, satisfying the Navier equation, is expressed by a combination of terms proportional to the zeroth-power, second-power, inverse third-power and fifth-power of the distance from the center of the spherical particle both outside and inside the spherical particle. For example, for the order $\ell = 2$, the formula is expressed by Equation (14). Obviously, the material constants inside the spherical particle are to be used as $\lambda$, $\mu$ in Equation (13). For outside the spherical particle, on the other hand, the material constants outside the spherical particle are to be used as $\lambda$, $\mu$ in Equation 14.

Equation 14

$$u_i = \left(r^2 x_i x_j - \frac{7\mu + 5\lambda}{7\mu + 2\lambda} r^2 \delta_{ij}\right) x_k \hat{\varepsilon}^\infty_{jk} \quad (14)$$

In short, it is possible to express the displacement $u_i$ as a combination of terms proportional to the zeroth-power, second-power, inverse third-power and fifth-power of the distance from the center of the spherical particle both inside and outside the spherical particle. Accordingly, it is possible to compute the shear term of the proportional constant $A(C^B, C^*)$ for deriving a recursive nonlinear equation.

Specifically, the stress inside the spherical particle, illustrated in Equation (15), is obtained by considering a condition of continuity of the displacement $u_i$ on the surface of the spherical particle and a condition of continuity of the surface traction on the surface of the spherical particle. Based on Equation (15), the shear term in the proportional constant $A(C^B, C^*)$ is expressed as illustrated by Equation (16). Therefore, the proportional constant $A^U$ of Urethane U is obtained by replacing $\mu^B$ in Equation (16) by $\mu^U$. Similarly, the proportional constant $A^F$ of Filler F is obtained by replacing $\mu^B$ in Equation (16) by $\mu^F$.

Equation 15

$$\sigma_{ij} = \frac{15\mu^B \cdot \{2 \cdot (\mu^*)^2 + \lambda^* \mu^*\} \cdot \hat{\sigma}^\infty_{ij}}{\mu^* \{14(\mu^*)^2 + 9\lambda^* \mu^* + 16\mu^B \mu^* + 6\lambda^* \mu^B\}} \quad (15)$$

Equation 16

$$\text{Shear element of } A(C^B, C^*) = \frac{15\{2(\mu^*)^2 + \lambda^* \mu^*\}}{14(\mu^*)^2 + 9\lambda^* \mu^* + 16\mu^B \mu^* + 6\lambda^* \mu^B} \quad (16)$$

Based on the above explanation, the proportional constant $A^U$ of Urethane U and the proportional constant $A^F$ of Filler F are determined. Then, the proportional constants are used in Equation (6) for computing the material constant $C^*$. Accordingly, a recursive nonlinear equation is derived. The recursive nonlinear equation is obtained by assuming a homogenized virtual composite material in which Urethane U and Filler F are dispersed in a form of spherical particles in Epoxy P and by defining a material constant in the surrounding areas of each of the spherical particles in the virtual composite material as the overall material constant of the virtual composite material to be computed.

As hereinafter described, a result of the overall material constant of the composite material computed by the computational method of the present invention using the virtual composite material is in good agreement with a result computed by the conventional method using a finite element model which requires a long period of computational time. As a conclusion, the computation result of the present method is highly accurate.

The following is an explanation of the method of computing the overall material constant C* of the composite material using the recursive nonlinear equation.

Figure 5:
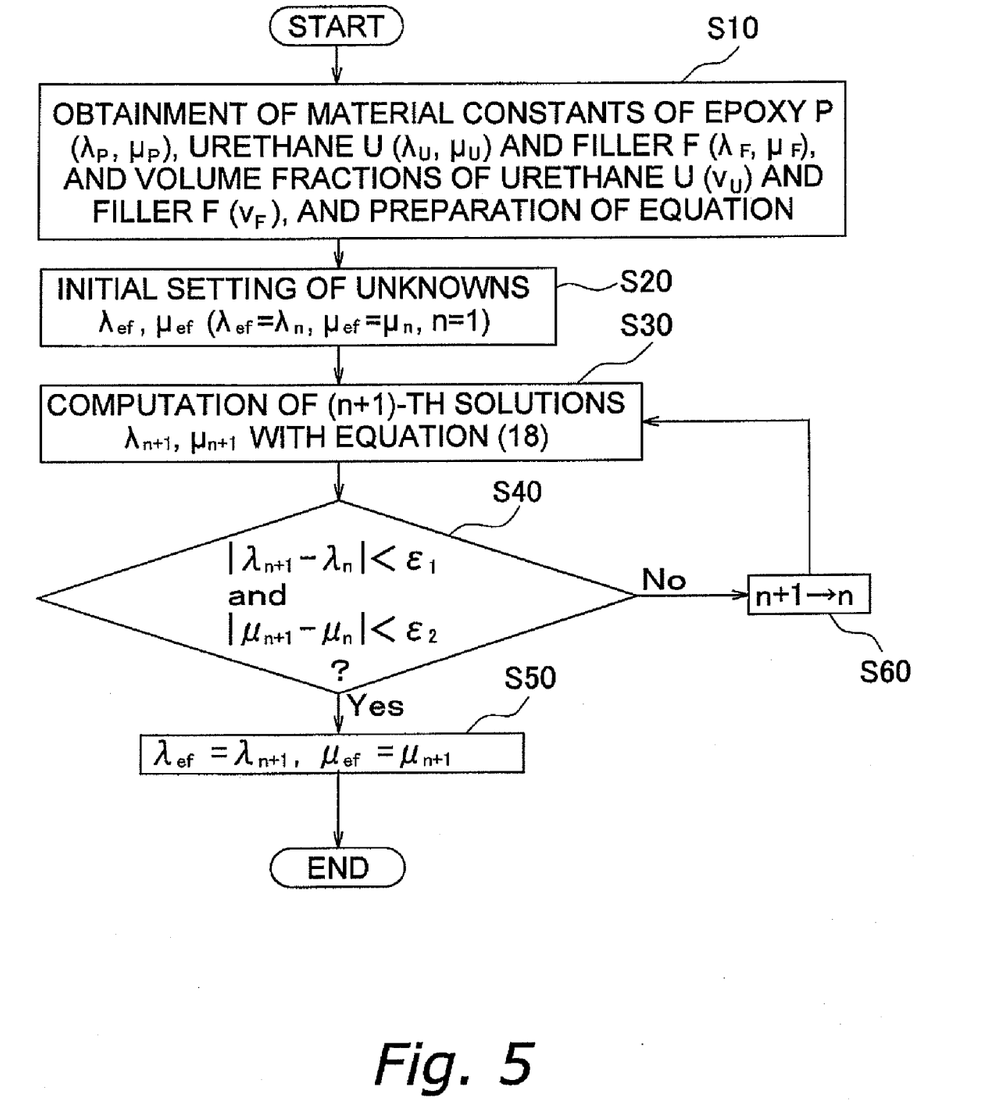
FIG. 5 is a flowchart for illustrating an example of the method of computing the material constant of a composite material according to the present invention.

FIG. 5 is a flowchart for illustrating a series of steps of computing the material constant C*.

First, the condition setting module 20 sets the first processing for computing the overall material constant C* of the composite material. The setting is executed by an instruction inputted by an operator through the input device 32. In this case, the material constant C* is represented by the Lamé constants $\lambda_{ef}$, $\mu_{ef}$ (i.e., unknowns to be computed).

Next, the module 20 calls up and obtains the value of the material constant $C^U$ of Urethane U (i.e., $\lambda^U$, $\mu^U$), the value of the material constant $C^F$ of Filler F (i.e., $\lambda^F$, $\mu^F$), the value of the material constant $C^P$ of Epoxy P (i.e., $\lambda^P$, $\mu^P$), the value of the volume fraction $v_u$ of Urethane U and the value of the volume fraction $v_F$ of Filler F from the database stored in the storage device 30 (Step SbO). In this case, the values of the material constants and the values of the volume fractions are fed into the nonlinear equation setting module 22, and the values of the coefficients in Equation (6) are therein determined. Thus, Equation (6) is modified to be interpreted as a recursive nonlinear equation having the material constant C* as the only unknown. In other words, an equation is herein prepared.

Next, the equation solver module 24 sets initial values of the Lamé constants $\lambda_{ef}$, $\mu_{ef}$, that is, the unknowns of the material constant C* (Step S20). Setting of the initial values is necessary because Equation (6) is a nonlinear equation and computation is repeatedly executed until convergence is reached. Any suitable value may be used as initial values. However, a good choice would be, for instance, the volume fraction-weighted average using the material constant $C^P$ of Epoxy P (i.e., the matrix phase) and the material constant $C^F$ of Filler F. The initial values of the Lamé constants $\lambda_{ef}$, $\mu_{ef}$ are set to be $\lambda_1$, $\mu_1$, respectively (i.e., $\lambda_{ef}=\lambda_1$, $\mu_{ef}=\mu_1$). Furthermore, the initial values are represented as $\lambda_n$, $\mu_n$, (n=1), respectively.

Next, in the equation solver module 24, Equation (17) is defined by modifying Equation (6). Specifically, the left-hand side of Equation (6) is moved to the right-hand side thereof, and the newly produced right-hand side is defined as "F(C*)." In this case, $A^U$ is $A(C^U, C^*)$ while $A^F$ is $A(C^F, C^*)$.

Equation (17)

$$F(C^*) = C^P + v_U \cdot (C^U - C^P) \cdot A(C^U, C^*) + v_F \cdot (C^F - C^P) \cdot A(C^F, C^*) - C^* \quad (17)$$

Furthermore, the module 24 defines $C^{(n+1)}$ using F(C*) in accordance with Equation (18). In this case, Equation (18) for obtaining convergence satisfying "F(C*)=0" is an equation to which the Newton-Raphson method is applied. Additionally, $C^{(n)}$ is represented in terms of the Lamé constants $\lambda_n$, $\mu_n$ whereas $C^{(n+1)}$ is represented in terms of the Lamé constants $\lambda_{n+1}$, $\mu_{n+1}$. The module 24 assigns the Lamé constants $\lambda_n$, $\mu_n$ to $C^{(n)}$ in Equation (18), and accordingly computes and obtains the Lamé constants $\lambda_{n+1}$, $\mu_{n+1}$ in accordance with Equation (18) (Step S30). In this case, $F'(C^{(n)})$ in Equation (18) is the Jacobian tensor of $F(C^{(n)})$ and $F'(C^{(n)})^{-1}$ is the inverse tensor of $F'(C^{(n)})$. In other words, the following relation is satisfied: $F'(C^{(n)})^{-1} \cdot F'(C^{(n)}) = I$ ("I" is the identity tensor).

Equation (18):

$$C^{(n+1)} = C^{(n)} - F'(C^{(n)})^{-1} F(C^{(n)}) \quad (18)$$

The computed Lamé constants $\lambda_{n+1}$, $\mu_{n+1}$ and the Lamé constants $\lambda_n$, $\mu_n$ used for the computation of the Lamé constants $\mu_{n+1}$, $\mu_{n+1}$ are sent to the convergence determination module 26. The module 26 computes the absolute value of the difference between $\lambda_{n+1}$ and $\lambda_n$ (i.e., the absolute value of "$\lambda_{n+1}-\mu_n$") and the absolute value of the difference between $\mu_{n+1}$ and $\mu_n$ (i.e., the absolute value of "$\mu_{n+1}-\mu_n$"). The module 26 compares the absolute value of "$\lambda_{n+1}-\lambda_n$" with a preliminarily-set threshold of $\epsilon_1$, and also compares the absolute value of "$\mu_{n+1}-\mu_n$" with a preliminarily-set threshold of $\epsilon_2$ (Step S40). When the following condition is satisfied as a result of comparison: "the absolute value of "$\lambda_{n+1}-\lambda_n$" is less than the threshold $\epsilon_1$ and the absolute value of "$\mu_{n+1}-\mu_n$" is less than the threshold $\epsilon_2$" (Yes in Step S40), the Lamé constants $\lambda^*$, $\mu^*$ (i.e., the overall material constant C* of the first virtual composite material to be computed) are determined to be $\lambda_{n+1}$, $\mu_{n+1}$, respectively (Step S50). On the other hand, when the aforementioned condition is not satisfied as a result of comparison (No in Step S40), "n+1" is replaced by "n" (Step S60) and the computation processing returns to Step S30 for computing the Lamé constants $\lambda_{n+1}$, $\mu_{n+1}$ using Equation (18). Thus, Steps S30, S40 and S60 are repeatedly executed until the condition of Step S40 is satisfied.

Next, the Young modulus E* is computed using the overall material constant C* of the composite material thus determined, specifically, the Lamé constants $\lambda^*$, $\mu^*$. The Young modulus E* is computed using Equation (19). The computed Young modulus E* is outputted to the output device (e.g., a printer and a display).

Equation (18)

$$E^* = \frac{\mu^*(3\lambda^* + 2\mu^*)}{\lambda^* + \mu^*} \quad (19)$$

The computed Young modulus E* is in good agreement with the Young modulus E computed by using a finite element model as hereinafter described. Therefore, it is clear that the method of computing the overall material constant of the composite material according to the present invention is beneficial. Furthermore, the method of the present invention is capable of analytically computing the overall material constant of the composite material using Equation (6). Accordingly, the method of the present invention is capable of computing the overall material constant of the composite material in a shorter period of time than the method using a finite element model. In this regard, the method of the present invention is more efficient than the method using a finite element model.

Equation (6), used in the method of computing the overall material constant of the composite material according to the present invention, is an analytic equation. For example, the volume fraction of a predetermined material component (e.g., Filler F) may be accordingly chosen to be an unknown to be computed. In this case, the overall material constant of the composite material is required to be preliminarily acquired by an experiment. Computation of the volume fraction of the predetermined material component corresponds to the aforementioned second processing. The following is a specific explanation of the second processing.

Figure 6:
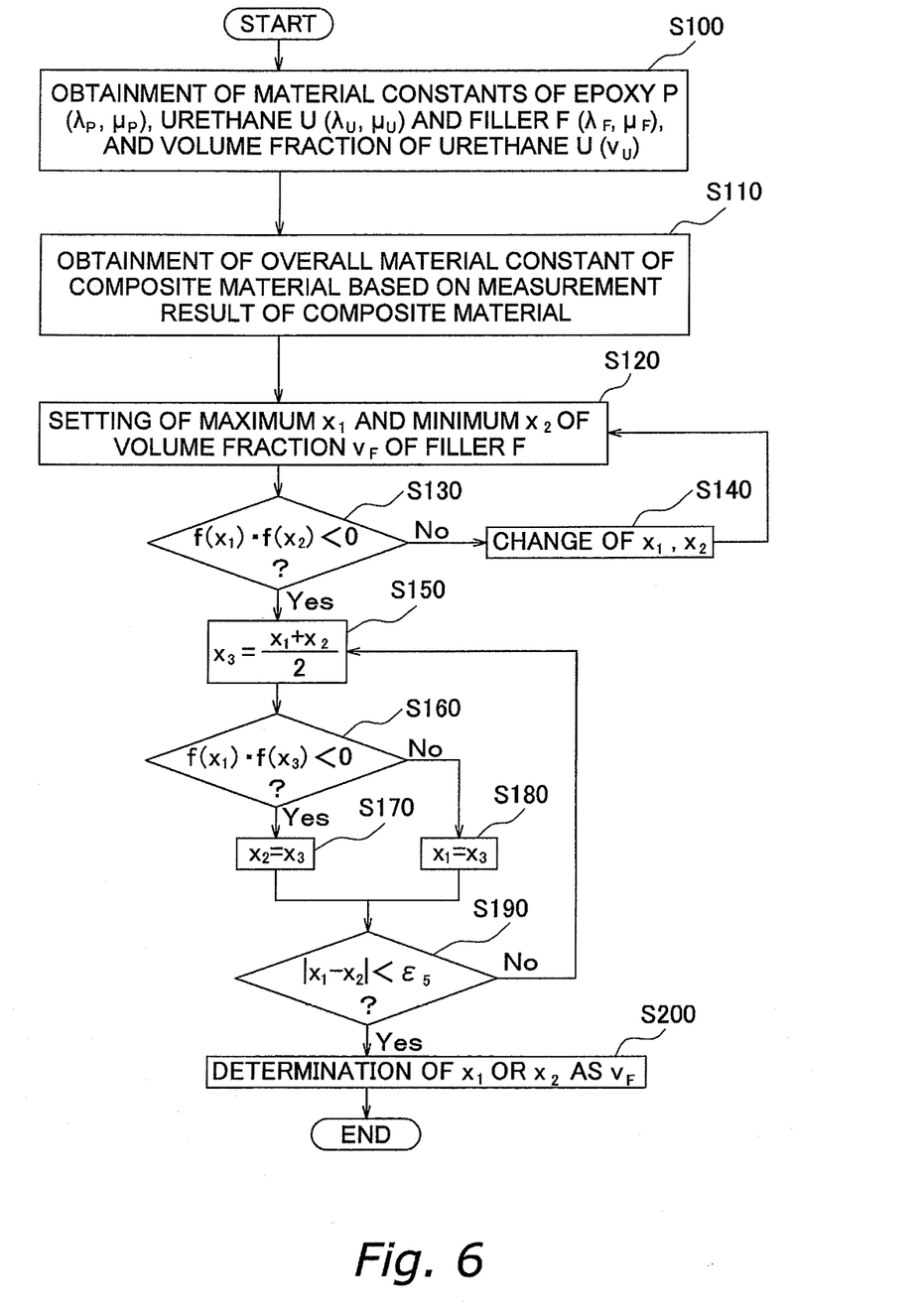
FIG. 6 is a flowchart for illustrating an example of the method of computing the volume fraction of a material component in a composite material according to the present invention.

FIG. 6 is a flowchart for illustrating a series of steps of the second processing. The second processing herein assumes computation of the volume fraction $v_F$ of Filler F in a composite material which includes Filler F and Urethane U in Epoxy P.

First, the condition setting module 20 obtains the material constant of Epoxy P (specifically $\lambda_P$, $\mu_P$), the material constant of Urethane U (specifically $\lambda_U$, $\mu_U$), the material constant of Filler F (specifically $\lambda_F$, $\mu_F$) and the volume fraction $v_U$ of Urethane U (Step S100). Specifically, the module 20 calls up and obtains the material constants and the like from the database stored in the storage device 30. Alternatively, the module 20 obtains the material constants and the like to be inputted through the input device 32.

Next, the overall material constant of the composite material (specifically $\lambda^*$, $\mu^*$) are obtained from a measurement result of a mechanical experiment of the composite material (Step S110). The measurement result has been preliminarily stored in the storage device 30. The module 20 calls up the measurement result from the storage device 30, and obtains the overall material constant of the composite material. The nonlinear equation setting module 22 gives values of the material constants obtained in Steps S100 and S110 to the coefficients in Equation (6), and thus sets an equation having the volume fraction $v_F$ as an unknown. Furthermore, the function f(x) is defined using Equation (6) as follows: f(x)=(the overall material constant of the composite material obtained by an experiment)−(the overall material constant of the composite material with the volume fraction x to be computed in Equation (6)).

Subsequently, the maximum $x_1$ and the minimum $x_2$ of the volume fraction $v_F$ of Filler F are respectively set (Step S120). The maximum and the minimum of the volume fraction $v_F$ are set for computing the volume fraction $v_F$ using the bisection method as hereinafter described. The maximum and the minimum of the volume fraction $v_F$ may be set by an instruction inputted by an operator through the input device 32. Alternatively, preliminarily-set default values may be used.

Next, the equation solver module 24 uses the maximum $x_1$ and the minimum $x_2$ to compute $f(x_1) \cdot f(x_2)$, and the convergence determination module 26 determines if the sign of $f(x_1) \cdot f(x_2)$ is negative (Step S130). When the module 26 determines that the sign of $f(x_1) \cdot f(x_2)$ is positive, the maximum $x_1$ and the minimum $x_2$ are changed (Step S140). A method for changing the maximum and the minimum is not limited to a specific method. However, the maximum $x_1$ is desirably changed to be as large as possible whereas the minimum $x_2$ is desirably changed to be as small as possible because "$x_1$" and "$x_2$" are the volume fractions.

When the module 26 determines that the sign of $f(x_1) \cdot f(x_2)$ is negative (Yes in Step S130), the following processing will be executed based on the bisectional method.

Specifically, the module 26 firstly computes "$x_3 = (x_1 + x_2)/2$" (Step S150), and the module 26 furthermore determines if the sign of $f(x_1) \cdot f(x_3)$ is negative (Step S160). When the module 26 determines that the sign of $f(x_1) \cdot f(x_3)$ is negative (Yes in Step S160), the minimum "$x_2$" is replaced by "$x_3$" (Step S170). On the other hand, when the module 26 determines that the sign of $f(x_1) \cdot f(x_3)$ is not negative (No in Step S160), the maximum "$x_1$" is replaced by "$x_3$" (Step S180).

Subsequently, the module 26 determines if the absolute value of the difference between the maximum $x_1$ and the minimum $x_2$ is less than a preliminarily-set threshold of $\epsilon_5$ (Step S190). When the module 26 determines that the absolute value is less than the threshold $\epsilon_5$ (Yes in Step S190), the maximum $x_1$ or the minimum $x_2$ is defined as the volume fraction $v_F$ to be computed (Step S200). When the module 26 determines that the absolute value is not less than the threshold $\epsilon_5$ (No in Step S190), the computation processing returns to Step S150. Thus, Steps S150, S160, S170 and S180 are repeatedly executed until the module 26 determines that the absolute value is less than the threshold c in Step S190.

With the aforementioned method, the volume fraction $v_F$ of Filler F is computed. The computed volume fraction $v_F$ of Filler F is outputted to the output device 34.

Note that not only the volume fraction of Filler F but also the volume fraction of Urethane U may be chosen as the intended volume fraction to be computed. Additionally, volume fractions of multiple kinds of material components may be chosen as intended volume fractions to be computed.

As described above, the composite material containing two different kinds of material components in the matrix phase is used for explaining the method of computing the overall material constant of the composite material and the method of computing the volume fraction. However, three kinds of material components may be dispersed in the matrix phase. Furthermore, the matrix phase may not be limited to epoxy. For example, any suitable inorganic material (e.g., metal and ceramic) may be used as the matrix phase. On the other hand, material components, included in the matrix phase, may not be limited to a reinforcement material for reinforcing the matrix phase. For example, any suitable soft material (e.g., urethane) may be used as the material component as described above.

Furthermore, the method of computing the overall material constant of the composite material and the method of computing the volume fraction are also achieved by causing a computer to run a program. In this case, the program is recorded in a computer-readable recording medium. Additionally, the recoding medium includes a program downloaded through the communication network.

Next, validation of the method of computing the overall material constant of the composite material will be hereinafter explained. The following is a list of materials for the composite material.

(1) Epoxy and urethane of 60 g, including the following:
Urethane modified epoxy of 30 g;
NBR modified epoxy of 20 g; and
Bisphenol A-type liquid epoxy of 10 g
(2) Filler of 35 g, including the following:
Silica of 15 g;
Calcium carbonate of 10 g; and
Calcium oxide of 10 g
(3) Curing material of 5 g, including the following:
DICY (Dicyandiamide) of 5 g.

The following are the Young moduli, the Poisson ratios and the volume fractions (%) of the components of the composite material. In this case, the Young moduli and the Poisson ratios were converted into the Lamé constants using a known equation, and the obtained Lamé constants are herein used.

|  | Young's Modulus (GPa) | Poisson's Ratio | Volume Fraction (%) |
| --- | --- | --- | --- |
| epoxy P | 3.8 | 0.35 | 54 |
| urethane U | 0.1 | 0.45 | 32 |
| filler F | 35 | 0.27 | 14 |

The Young modulus was computed to be 2.126 (GPa) as a result of computing the overall material constant of the composite material according to the present invention. On the other hand, the Young modulus was computed to be 2.007 (GPa) as a result of an analysis of the composite material using the finite element model.

Consequently, the Young modulus computed using the method of the present invention is in good agreement with the Young modulus computed using the finite element model and the Young modulus obtained in an experiment. Therefore, it is clear that the method of the present invention is beneficial.

Figure 7:
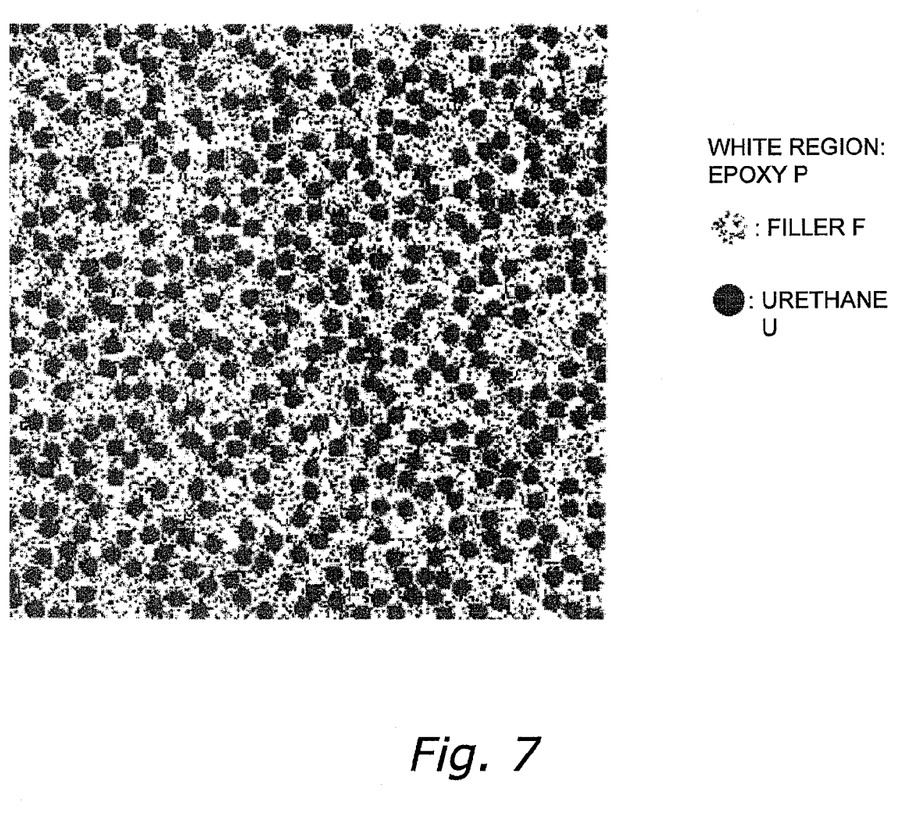
FIG. 7 is a diagram for illustrating a finite element model of a composite material.

Note that computation of the material constant was executed using a finite element model as follows. First, a finite element model was produced by assuming the following composite material. As illustrated in FIG. 7, the composite material was composed of Epoxy P (i.e., the matrix phase), Urethane U and Filler F dispersed in Epoxy P. Urethane U was in a form of spherical particles, and was embedded in Epoxy P at the volume fraction of 32%. Filler F was embedded in Epoxy P at the volume fraction of 14%. Based on this, the overall material constant of the composite material was computed. Also, the initial slope of stress-strain curve was computed under the condition that a tensile displacement was applied to the upper end shown in FIG. 7. Based on this, the Young modulus was obtained. Note that the above-produced finite element model was a two-dimensional plane stress element model which has 65536 elements and 66049 nodes. Furthermore, "ABAQUS,", commercial application software of a nonlinear finite element method, was used for the analysis.

As described above, the embodiment of the present invention specifically explains the method of computing the overall material constant of a composite material, the method of computing the volume fractions of material components in the composite material, and a recording medium which stores a program for causing a computer to execute the methods. However, the present invention is not limited to the aforementioned embodiment. Obviously, a variety of changes and modifications may be possible with respect to the present invention without departing from the scope of the present invention.

What is claimed is:

1. A method of computing an overall mechanical material constant of a composite material which includes multiple kinds of material components in a matrix phase, each of mechanical material constants of the material components and the matrix phase being known, comprising the steps of:
controlling a nonlinear equation setting component of a computer to prepare a nonlinear equation having an overall material constant of a virtual composite material as an unknown by defining, as the composite material, the virtual composite material in which the material components are dispersed in a form of spherical particles in the matrix phase at known volume fractions; and
controlling an equation solver component of the computer to compute the overall material constant of the virtual composite material as the overall material constant of the composite material by solving the prepared nonlinear equation, and
wherein the nonlinear equation is a recursive nonlinear equation which is obtained by determining, as the overall material constant of the virtual composite material to be computed, a material constant in surrounding areas of the spherical particles corresponding to the multiple kinds of material components in the virtual composite material.

2. The method according to claim 1, wherein,
when the material constant of the matrix phase, the material constants of the multiple kinds of material components, the volume fractions of the multiple kinds of material components and the material constant of the virtual composite material are defined as $C^A$, $C^{B1}$, $C^{B2}$, ... and $C^{Bn}$ ("n" is an integer equal to or greater than 2), $v_{B1}$, $v_{B2}$, ... and $v_{Bn}$, and $C^*$, respectively, the nonlinear equation is expressed as:

$$C^* = C^A + v_{B1} \cdot (C^{B1} - C^A) \cdot A(C^{B1}, C^*) + v_{B2} \cdot (C^{B2} - C^A) \cdot A(C^{B2}, C^*) \ldots + v_{Bn} \cdot (C^{Bn} - C^A) \cdot A(C^{Bn}, C^*),$$

and expressions $A(C^{B1}, C^*)$, $A(C^{B2}, C^*)$, ... $A(C^{Bn}, C^*)$ in the equation are obtained by determining the material constant in the surrounding areas of the spherical particles in the virtual composite material as the overall material constant of the virtual composite material to be computed, and the expressions are proportional constants to be found using an equation which is nonlinear with respect to the overall material constant $C^*$.

3. The method according to claim 1, wherein,
when each of stress and strain of the virtual composite material is decomposed into a shear term and a hydrostatic pressure term and a displacement corresponding to the hydrostatic pressure term in the virtual composite material is defined as $u_i$ (i=1, 2 or 3),
the nonlinear equation is prepared by defining
the displacement $u_i$ inside each of the spherical particles to be proportional to a position $x_i$ (i=1, 2 or 3) with an origin at a center of each of the spherical particles; and
the displacement $u_i$ outside each of the spherical particles to have:
a term which is proportional to the position $x_i$ (i=1, 2 or 3) with the origin at the center of each of the spherical particles and a term which is proportional to the position $x_i$ and inversely proportional to third power of a distance from the center of each of the spherical particles.

4. The method according to claim 1, wherein,
when each of stress and strain in the virtual composite material is decomposed into a shear term and a hydrostatic pressure term and a displacement corresponding to the shear term in the virtual composite material is defined as $u_i$ (i=1, 2 or 3), and
the nonlinear equation is prepared by determining the displacement $u_i$ using a combination of terms proportional to zeroth-power, second-power, inverse third-power and fifth-power of a distance from a center of each of the spherical particles, respectively, both inside and outside each of the spherical particles.

5. The method according to claim 1, wherein the nonlinear equation is solved for a solution to reach convergence using a Newton-Raphson method.

6. A method of computing a volume fraction of any one of multiple kinds of material components in a composite material which includes the multiple kinds of material components in a matrix phase, each of mechanical material constants of the material components and the matrix phase being known, comprising the steps of:
controlling a condition setting component of a computer to determine the overall material constant of the composite material from an experimental result;
controlling a nonlinear equation setting component of the computer to prepare a nonlinear equation having a volume fraction of any one of multiple kinds of material components in a virtual composite material as an unknown by defining, as the composite material, the virtual composite material in which each of the multiple kinds of material components is dispersed in a form of spherical particles in the matrix phase; and
controlling an equation solver component of the computer to compute the volume fraction of any one of the multiple kinds of material components by solving the prepared nonlinear equation, and
wherein the nonlinear equation is a recursive nonlinear equation which is obtained by defining, as the determined material constant of the composite material, a material constant in surrounding areas of the spherical particles in the virtual composite material.

7. The method according to claim 6, wherein, when the material constant of the matrix phase, the material constants of the multiple kinds of material components, the material constant of the virtual composite material and the volume fractions of the multiple kinds of material components are denoted as $C^A$, $C^{B1}$, $C^{B2}$, ... and $C^{Bn}$ ("n" is an integer equal to or greater than 2), $C^*$ and $v_{B1}$, $v_{B2}$, ... and $v_{Bn}$, respectively, the nonlinear equation is expressed as:

$$C^* = C^A + v_{B1} \cdot (C^{B1} - C^A) \cdot A(C^{B1}, C^*) + v_{B2} \cdot (C^{B2} - C^A) \cdot A(C^{B2}, C^*) \ldots + v_{Bn} \cdot (C^{Bn} - C^A) \cdot A(C^{Bn}, C^*), \text{ and}$$

expressions $A(C^{B1}, C^*)$, $A(C^{B2}, C^*)$, ... and $A(C^{Bn}, C^*)$ in the equation are obtained by defining, as the overall material constant of the virtual composite material to be computed, the material constant in the surrounding areas of the spherical particles in the virtual composite material, and the expressions are proportional constants to be found using an equation which is nonlinear with respect to the material constant $C^*$.

8. The method according to claim 6, wherein, when each of stress and strain of the virtual composite material is decomposed into a shear term and a hydrostatic pressure term and a displacement corresponding to the hydrostatic pressure term in the virtual composite material is defined as $u_i$ ($i=1, 2$ or $3$), the nonlinear equation is prepared by stating the displacement $u_i$ inside each of the spherical particles to be proportional to a position $x_i$ ($i=1, 2$ or $3$) with an origin at a center of each of the spherical particles; and the displacement $u_i$ outside the spherical particle to have:

a term proportional to the position $x_i$ ($i=1, 2$ or $3$) with the origin at the center of each of the spherical particles and a term which is proportional to the position $x_i$ and inversely proportional to third power of a distance from the center of each of the spherical particles.

9. The method according to claim 6, wherein, when each of stress and strain of the virtual composite material is decomposed into a shear term and a hydrostatic pressure term and a displacement corresponding to the shear term in the virtual composite material is denoted as $u_i$ ($i=1, 2$ or $3$), and the nonlinear equation is prepared by finding the displacement $u_i$ as a combination of terms proportional to zeroth-power, second-power, inverse third-power and fifth-power of a distance from a center of each of the spherical particles, respectively, both inside and outside each of the spherical particles.

10. The method according to claim 6, wherein the nonlinear equation is solved using a bisectional method.

11. A non-transitory computer readable medium storing a computer-executable program for computing an overall material constant of a composite material which includes multiple kinds of material components in a matrix phase, each of mechanical material constants of the material components and the matrix phase being known, wherein the program causes a computer to execute a method comprising:

controlling a nonlinear equation setting component of a computer to prepare a nonlinear equation having an overall material constant of a virtual composite material as an unknown by defining, as the composite material, the virtual composite material in which multiple kinds of material components are dispersed in a form of spherical particles in the matrix phase at known volume fractions; and controlling an equation solver component of the computer to compute the overall material constant of the virtual composite material as the overall material constant of the composite material by solving the prepared nonlinear equation, and wherein the nonlinear equation is a recursive nonlinear equation which is obtained by defining, as the overall material constant of the virtual composite material to be computed, a material constant in surrounding areas of the spherical particles corresponding to the multiple kinds of material components in the virtual composite material.

12. A non-transitory computer readable medium storing a computer-executable program for computing a volume fraction of any one of multiple kinds of material components in a composite material which includes multiple kinds of material components in a matrix phase, each of mechanical material constants of the multiple kinds of material components and the matrix phase being known, wherein the program causes a computer to execute a method comprising:

controlling a condition setting component of a computer to determine an overall material constant of the composite material from an experimental result;

controlling a nonlinear equation setting component of the computer to prepare a nonlinear equation having a volume fraction of any one of the multiple kinds of material components in a virtual composite material as an unknown by defining, as the composite material, the virtual composite material in which each of the multiple kinds of material components is dispersed in a form of spherical particles in the matrix phase; and controlling an equation solver component of the computer to compute the volume fraction of any one of the multiple kinds of material components by solving the prepared nonlinear equation, and wherein the nonlinear equation is a recursive nonlinear equation which is obtained by defining, as the determined material constant of the composite material, a material constant in surrounding areas of the spherical particles of each of the multiple kinds of material components in the virtual composite material.

* * * * *